United States Patent
Wagoner et al.

(10) Patent No.: US 10,871,145 B2
(45) Date of Patent: Dec. 22, 2020

(54) SYSTEM AND METHOD FOR PREVENTING VOLTAGE COLLAPSE OF WIND TURBINE POWER SYSTEMS CONNECTED TO A POWER GRID

(71) Applicant: General Electric Company, Schenetady, NY (US)

(72) Inventors: Robert Gregory Wagoner, Roanoke, VA (US); Zhuohui Tan, Shanghai (CN); Weihao Zhou, Shanghai (CN); Nithya Anand, Bangalore (IN)

(73) Assignee: General Electric Company, Schenectady, NY (US)

( * ) Notice: Subject to any disclaimer, the term of this patent is extended or adjusted under 35 U.S.C. 154(b) by 140 days.

(21) Appl. No.: 16/119,119

(22) Filed: Aug. 31, 2018

(65) Prior Publication Data

US 2019/0072073 A1   Mar. 7, 2019

(30) Foreign Application Priority Data

Sep. 4, 2017   (CN) .......................... 2017 1 0786179

(51) Int. Cl.
*F03D 7/02* (2006.01)
*H02J 3/24* (2006.01)
(Continued)

(52) U.S. Cl.
CPC ........... *F03D 7/0284* (2013.01); *F03D 9/257* (2017.02); *G05B 19/02* (2013.01); *H02J 3/16* (2013.01);
(Continued)

(58) Field of Classification Search
CPC .......... F03D 7/0284; F03D 17/00; F03D 7/00; F03D 9/257; H02P 9/007; G05B 19/02;
(Continued)

(56) References Cited

U.S. PATENT DOCUMENTS

| | | |
|---|---|---|
| 8,659,178 B2 | 2/2014 | Arlaban Gabeiras et al. |
| 8,823,191 B2 | 9/2014 | Andresen et al. |

(Continued)

FOREIGN PATENT DOCUMENTS

| | | |
|---|---|---|
| EP | 2 419 983 A1 | 2/2012 |
| EP | 2 662 944 A1 | 11/2013 |
| WO | 2016/062316 A1 | 4/2016 |

OTHER PUBLICATIONS

Baron et al., Breaking the 34.5kV Standard, Drawing on hydro experience, Acciona extols use of 12kV collection system to lower energy costs through elimination of step-up transformers, Wind Systems Magazine, Apr. 2013, pp. 48-54.

(Continued)

*Primary Examiner* — Mohammad Ali
*Assistant Examiner* — Sheela Rao
(74) *Attorney, Agent, or Firm* — Dority & Manning, P.A.

(57) ABSTRACT

A system and method for preventing voltage collapse of a wind turbine power system includes receiving a power input value and a voltage input value from a point of common coupling of the wind turbine power system. The method also includes determining a limit cycle reference point of the wind turbine power system as a function of the input values. The method further includes comparing the limit cycle reference point to at least one predetermined threshold. If the limit cycle reference point is greater than the at least one predetermined threshold, the method includes determining a delta value for the real and reactive voltage commands of the wind turbine power system. Further, the method includes determining updated real and reactive voltage commands based on the delta value. As such, the method also includes operating the wind turbine power system based on the updated real and reactive voltage commands.

16 Claims, 9 Drawing Sheets

(51) Int. Cl.
*H02P 9/00* (2006.01)
*H02J 3/16* (2006.01)
*H02J 3/38* (2006.01)
*F03D 9/25* (2016.01)
*G05B 19/02* (2006.01)

(52) U.S. Cl.
CPC ............ *H02J 3/24* (2013.01); *H02J 3/386* (2013.01); *H02P 9/007* (2013.01); *F05B 2220/706* (2013.01); *F05B 2270/1033* (2013.01); *F05B 2270/335* (2013.01); *F05B 2270/337* (2013.01); *F05B 2270/402* (2013.01); *F05B 2270/504* (2013.01); *G05B 2219/2619* (2013.01)

(58) Field of Classification Search
CPC ....... G05B 2219/2619; F05B 2220/706; F05B 2270/1033; F05B 2270/335; F05B 2270/402; F05B 2270/504; F05B 2270/337; Y02E 10/76; Y02E 10/72; H02J 3/381; H02J 2300/28; H02J 3/24; H02J 3/16; H02J 3/386
See application file for complete search history.

(56) References Cited

U.S. PATENT DOCUMENTS

| | | |
|---|---|---|
| 9,587,626 B2 | 3/2017 | Sadaba et al. |
| 2012/0112713 A1* | 5/2012 | Kuehn ............... H02J 3/24 323/207 |
| 2013/0300118 A1* | 11/2013 | Bech ............... F03D 9/257 290/44 |

OTHER PUBLICATIONS

Olonso Sadaba et al., Wind Generation Control Strategies for Grid Integration Acciona Windpower Experience, ResearchGate, Acciona Windpower, S.A., uploaded 2015, 11 Pages. https://www.researchgate.net/publication/267966410.

Extended European Search Report issued in connection with corresponding EP Application No. 18190575.3 dated Nov. 19, 2018.

* cited by examiner

SYSTEM AND METHOD FOR PREVENTING VOLTAGE COLLAPSE OF WIND TURBINE POWER SYSTEMS CONNECTED TO A POWER GRID

FIELD

The present disclosure relates generally to wind turbines and, more particularly, to systems and methods for preventing voltage collapse of wind turbine power systems connected to a power grid.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

During operation, wind impacts the rotor blades of the wind turbine and the blades transform wind energy into a mechanical rotational torque that rotatably drives a low-speed shaft. The low-speed shaft is configured to drive the gearbox that subsequently steps up the low rotational speed of the low-speed shaft to drive a high-speed shaft at an increased rotational speed. The high-speed shaft is generally rotatably coupled to a generator so as to rotatably drive a generator rotor. As such, a rotating magnetic field may be induced by the generator rotor and a voltage may be induced within a generator stator that is magnetically coupled to the generator rotor. In certain configurations, the associated electrical power can be transmitted to a turbine transformer that is typically connected to a power grid via a grid breaker. Thus, the turbine transformer steps up the voltage amplitude of the electrical power such that the transformed electrical power may be further transmitted to the power grid.

In many wind turbines, the generator rotor may be electrically coupled to a bi-directional power converter that includes a rotor-side converter joined to a line-side converter via a regulated DC link. More specifically, some wind turbines, such as wind-driven doubly-fed induction generator (DFIG) systems or full power conversion systems, may include a power converter with an AC-DC-AC topology.

In addition, a plurality of the wind turbines may be arranged in a predetermined geological location and electrically connected together to form a wind farm. In some instances, each of the individual wind turbines of a wind farm may be individually connected to the power grid via a grid isolation transformer. Further, the wind farm may be connected to the power grid via a sub-station transformer. Moreover, the wind turbines may be arranged in one or more clusters with each cluster being connected to the power grid via a common cluster transformer.

For any of the aforementioned wind turbine arrangements, a weak power grid can create risks of power and/or volt oscillations as well as transient voltage instability during fault recovery. Accordingly, a control methodology for preventing voltage collapse of such wind turbine power systems would be welcomed in the art.

BRIEF DESCRIPTION

Aspects and advantages of the invention will be set forth in part in the following description, or may be obvious from the description, or may be learned through practice of the invention.

In one aspect, the present subject matter is directed to a method for preventing voltage collapse of a wind turbine power system connected to a power grid. The method includes receiving, via a controller of the wind turbine power system, at least one input value from a point of common coupling of the wind turbine power system. The method also includes determining, via the controller, a limit cycle reference point of the wind turbine power system as a function of the input value. As used herein, the limit cycle reference point is representative of a proximity of the at least one input value to an operational point at which voltage collapse occurs. The method further includes comparing the limit cycle reference point to at least one predetermined threshold. If the limit cycle reference point is greater than the at least one predetermined threshold, the method includes determining a delta value for at least one command of the wind turbine power system. Further, the method includes determining at least one updated command based on the delta value and the at least one command. As such, the method also includes operating the wind turbine power system based on the at least one updated command.

In one embodiment, the input value(s) may include a power value at the point of common coupling and/or a voltage value at the point of common coupling. As such, in another embodiment, the method may include calculating the limit cycle reference point of the wind turbine power system as a function of the power value and the voltage value.

In further embodiments, the predetermined threshold(s) may include a first predetermined threshold and/or a second predetermined threshold. In such embodiments, the method may include adding the delta power value to at least one of a power command or a power limiter of the wind turbine power system if the limit cycle reference point is greater than the first predetermined threshold. Further, the method may include adding the delta power value to a one or more gain coefficients of a voltage regulator of the wind turbine power system if the limit cycle reference point is less than the first predetermined threshold and greater than the second predetermined threshold.

In additional embodiments, the method may include implementing a corrective action if the limit cycle reference point is greater than a damage threshold.

In several embodiments, the operational point may correspond to a value on a curve of the voltage value versus the power value at which a slope of the curve is substantially vertical. In such embodiments, the step of operating the wind turbine power system based on the updated command(s) may include minimizing an area of the curve representative of a limit cycle so as to maximize power while preventing voltage collapse.

In certain embodiments, the power grid may be a weak grid, which is characterized by short circuit currents within a predetermined range of short circuit currents of the wind turbine power system. For example, in one embodiment, the predetermined range may include ratios of the short circuit currents of the power grid to the short circuit currents of the wind turbine power system of from about 0.8 to about 1.2.

In another aspect, the present disclosure is directed to a system for preventing voltage collapse of a wind turbine power system connected to a power grid. The system includes one or more sensors for monitoring at least one input value from a point of common coupling of the wind turbine power system, and a controller communicatively coupled to the one or more sensors. The controller is configured to perform one or more operations, including but not limited to determining a limit cycle reference point of the wind turbine power system as a function of the input value, the limit cycle reference point representative of a proximity of the at least one input value to an operational point at which voltage collapse occurs, comparing the limit cycle reference point to at least one predetermined threshold, if the limit cycle reference point is greater than the at least one predetermined threshold, determining a delta value for at least one command of the wind turbine power system, determining at least one updated command based on the delta value and the at least one command, and operating the wind turbine power system based on the at least one updated command.

It should be understood that the system may further include any of the additional features as described herein. Further, the wind turbine power system may include a wind farm having one or more wind turbines connected to the power grid. As such, each of the wind turbines may be connected to the power grid via a turbine transformer. Further, the wind farm may be connected to the power grid via a sub-station transformer. In addition, the wind turbines may be arranged into one or more clusters or groups that are connected to the power grid via a common cluster transformer.

In yet another aspect, the present disclosure is directed to a method for preventing voltage collapse of a wind turbine power system connected to a power grid. The method includes determining, via the controller, a limit cycle reference point of the wind turbine power system as a function of at least one input value from a point of common coupling of the wind turbine power system. As used herein, the limit cycle reference point is representative of a proximity of the at least one input value to an operational point at which voltage collapse occurs. The method also includes comparing the limit cycle reference point to at least one predetermined threshold. If the limit cycle reference point is greater than the at least one predetermined threshold, the method further includes determining at least one updated command for the wind turbine power system. It should be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure provides an updated control scheme having a voltage collapse governor that generates real and reactive voltage commands. Thus, the real and reactive voltage commands are configured to prevent voltage collapse of a wind turbine power system connected to a power grid. In one embodiment, the method includes receiving a power input value and a voltage input value from a point of common coupling of the wind turbine power system. The method also includes determining a limit cycle reference point of the wind turbine power system as a function of the input values. The method further includes comparing the limit cycle reference point to at least one predetermined threshold. If the limit cycle reference point is greater than the at least one predetermined threshold, the method includes determining a delta value for the real and reactive voltage commands of the wind turbine power system. Further, the method includes determining updated real and reactive voltage commands based on the delta value. As such, the method also includes operating the wind turbine power system based on the updated real and reactive voltage commands.

The present disclosure provides many advantages not present in the prior art. For example, the system and method of the present disclosure provides limit cycle-based oscillation detection. Further, the present disclosure is configured to determine dynamic gains for the volt/current loop based on a limit cycle index. As such, the present disclosure can provide a dynamic power limit and recovery rate based on the limit cycle index. In addition, the present disclosure prevents multiple voltage collapse (pole-slip) during grid fault recovery, and avoids power/volt oscillation or transient voltage stability for weak grids.

Figure 1:
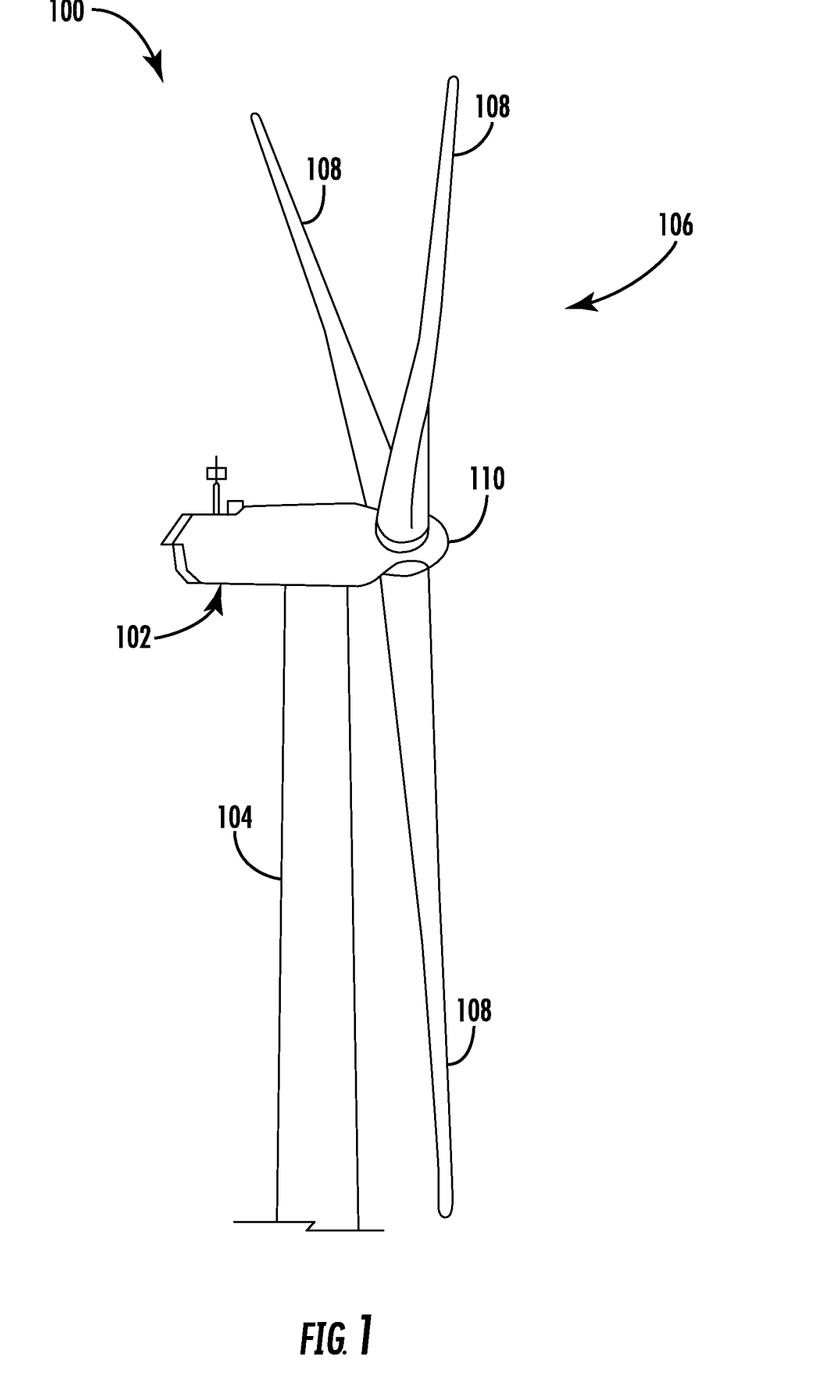
FIG. 1 illustrates a perspective view of a portion of one embodiment of a wind turbine according to the present disclosure.

Referring now to the drawings, FIG. 1 illustrates a perspective view of a portion of an exemplary wind turbine 100 according to the present disclosure that is configured to implement the method and apparatus as described herein. The wind turbine 100 includes a nacelle 102 that typically houses a generator (not shown). The nacelle 102 is mounted on a tower 104 having any suitable height that facilitates operation of wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein.

Figure 2:
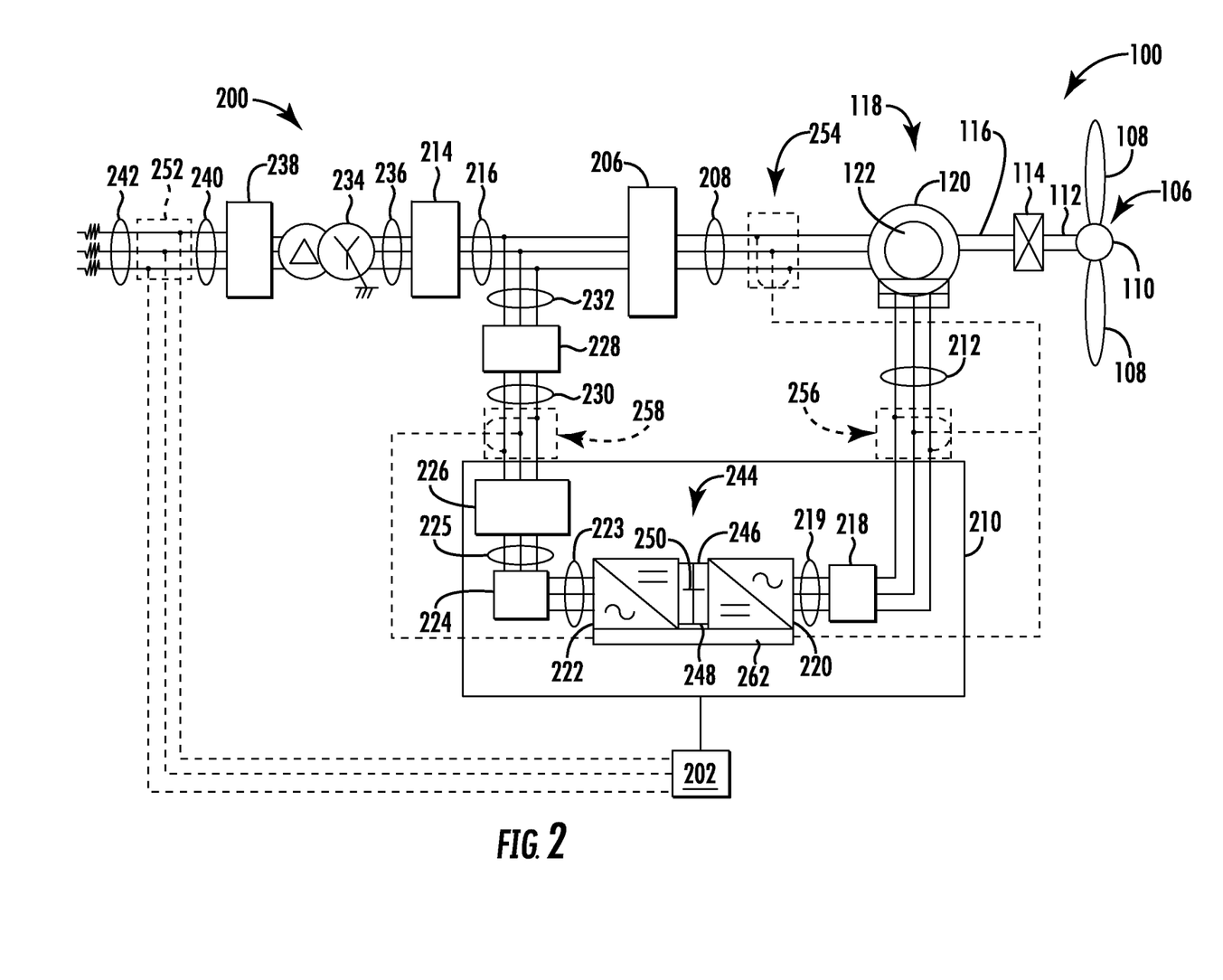
FIG. 2 illustrates a schematic view of one embodiment of an electrical and control system suitable for use with the wind turbine shown in FIG. 1.

Referring to FIG. 2, a schematic view of an exemplary electrical and control system 200 that may be used with the wind turbine 100 is illustrated. During operation, wind impacts the blades 108 and the blades 108 transform wind energy into a mechanical rotational torque that rotatably drives a low-speed shaft 112 via the hub 110. The low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122. In one embodiment, the generator 118 may be a wound rotor, three-phase, double-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In one embodiment, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a grid circuit breaker 238, a breaker-side bus 240, and a grid bus 242.

Figure 3:
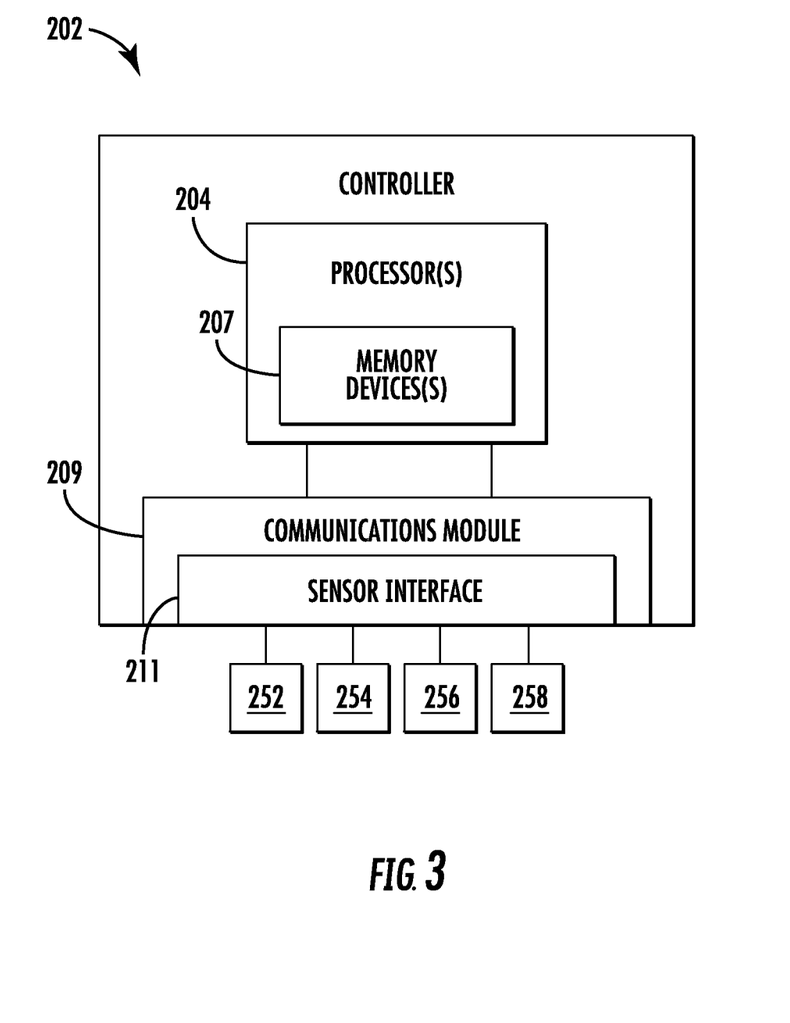
FIG. 3 illustrates a block diagram of one embodiment of a controller suitable for use with the wind turbine shown in FIG. 1.

In addition, the electrical and control system 200 may include a wind turbine controller 202 configured to control any of the components of the wind turbine 100 and/or implement the method steps as described herein. For example, as shown particularly in FIG. 3, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module 209 to facilitate communications between the controller 202 and the various components of the wind turbine 100, e.g. any of the components of FIG. 2. Further, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 258) may be communicatively coupled to the communications module 209 using any suitable means. For example, as shown in FIG. 3, the sensors 252, 254, 256, 258 may be coupled to the sensor interface 211 via a wired connection. However, in other embodiments, the sensors 252, 254, 256, 258 may be coupled to the sensor interface 211 via a wireless connection, such as by using any suitable wireless communications protocol known in the art. As such, the processor 204 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

Referring back to FIG. 2, the generator stator 120 may be electrically coupled to a stator synchronizing switch 206 via a stator bus 208. In one embodiment, to facilitate the DFIG configuration, the generator rotor 122 is electrically coupled to a bi-directional power conversion assembly 210 or power converter via a rotor bus 212. Alternatively, the generator rotor 122 may be electrically coupled to the rotor bus 212 via any other device that facilitates operation of electrical and control system 200 as described herein. In a further embodiment, the stator synchronizing switch 206 may be electrically coupled to a main transformer circuit breaker 214 via a system bus 216.

The power conversion assembly 210 may include a rotor filter 218 that is electrically coupled to the generator rotor 122 via the rotor bus 212. In addition, the rotor filter 218 may include a rotor-side reactor. A rotor filter bus 219 electrically couples the rotor filter 218 to a rotor-side power converter 220. Further, the rotor-side power converter 220 may be electrically coupled to a line-side power converter 222 via a single direct current (DC) link 244. Alternatively, the rotor-side power converter 220 and the line-side power converter 222 may be electrically coupled via individual and separate DC links. In addition, as shown, the DC link 244 may include a positive rail 246, a negative rail 248, and at least one capacitor 250 coupled therebetween.

In addition, a line-side power converter bus 223 may electrically couple the line-side power converter 222 to a line filter 224. Also, a line bus 225 may electrically couple the line filter 224 to a line contactor 226. In addition, the line filter 224 may include a line-side reactor. Moreover, the line contactor 226 may be electrically coupled to a conversion circuit breaker 228 via a conversion circuit breaker bus 230. In addition, the conversion circuit breaker 228 may be electrically coupled to the main transformer circuit breaker 214 via system bus 216 and a connection bus 232. The main transformer circuit breaker 214 may be electrically coupled to an electric power main transformer 234 via a generator-side bus 236. The main transformer 234 may be electrically coupled to a grid circuit breaker 238 via a breaker-side bus 240. The grid circuit breaker 238 may be connected to the electric power transmission and distribution grid via a grid bus 242.

In operation, alternating current (AC) power generated at the generator stator 120 by rotation of the rotor 106 is provided via a dual path to the grid bus 242. The dual paths are defined by the stator bus 208 and the rotor bus 212. On the rotor bus side 212, sinusoidal multi-phase (e.g. three-phase) AC power is provided to the power conversion assembly 210. The rotor-side power converter 220 converts the AC power provided from the rotor bus 212 into DC power and provides the DC power to the DC link 244. Switching elements (e.g. IGBTs) used in bridge circuits of the rotor side power converter 220 can be modulated to convert the AC power provided from the rotor bus 212 into DC power suitable for the DC link 244.

The line side converter 222 converts the DC power on the DC link 244 into AC output power suitable for the electrical grid bus 242. In particular, switching elements (e.g. IGBTs) used in bridge circuits of the line side power converter 222 can be modulated to convert the DC power on the DC link 244 into AC power on the line side bus 225. The AC power from the power conversion assembly 210 can be combined with the power from the stator 120 to provide multi-phase power (e.g. three-phase power) having a frequency maintained substantially at the frequency of the electrical grid bus 242 (e.g. 50 Hz/60 Hz). It should be understood that the rotor-side power converter 220 and the line-side power converter 222 may have any configuration using any switching devices that facilitate operation of electrical and control system 200 as described herein.

Further, the power conversion assembly 210 may be coupled in electronic data communication with the turbine controller 202 and/or a separate or integral converter controller 262 to control the operation of the rotor-side power converter 220 and the line-side power converter 222. For example, during operation, the controller 202 may be configured to receive one or more voltage and/or electric current measurement signals from the first set of sensors 252. Thus, the controller 202 may be configured to monitor and control at least some of the operational variables associated with the wind turbine 100 via the sensors 252. In the illustrated embodiment, each of the sensors 252 may be electrically coupled to each one of the three phases of the power grid bus 242. Alternatively, the sensors 252 may be electrically coupled to any portion of electrical and control system 200 that facilitates operation of electrical and control system 200 as described herein. In addition to the sensors described above, the sensors may also include a second set of sensors 254, a third set of sensors 256, a fourth set of sensors 258 (all shown in FIG. 2), and/or any other suitable sensors.

It should also be understood that any number or type of voltage and/or electric current sensors may be employed within the wind turbine 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art.

Thus, the converter controller 262 is configured to receive one or more feedback signals from the sensors 252, 254, 256, 258 (e.g. representing voltage, current, temperature, light, arc flash, etc.). More specifically, in certain embodiments, the current or voltage feedback signals may include at least one of line feedback signals, line-side converter feedback signals, rotor-side converter feedback signals, or stator feedback signals. For example, as shown in the illustrated embodiment, the converter controller 262 receives voltage and electric current measurement signals from the second set of voltage and electric current sensors 254 coupled in electronic data communication with stator bus 208. The converter controller 262 may also receive the third and fourth set of voltage and electric current measurement signals from the third and fourth set of voltage and electric current sensors 256, 258. In addition, the converter controller 262 may be configured with any of the features described herein in regards to the main controller 202. Further, the converter controller 262 may be separate from or integral with the main controller 202. As such, the converter controller 262 is configured to implement the various method steps as described herein and may be configured similar to the turbine controller 202.

Figure 4:
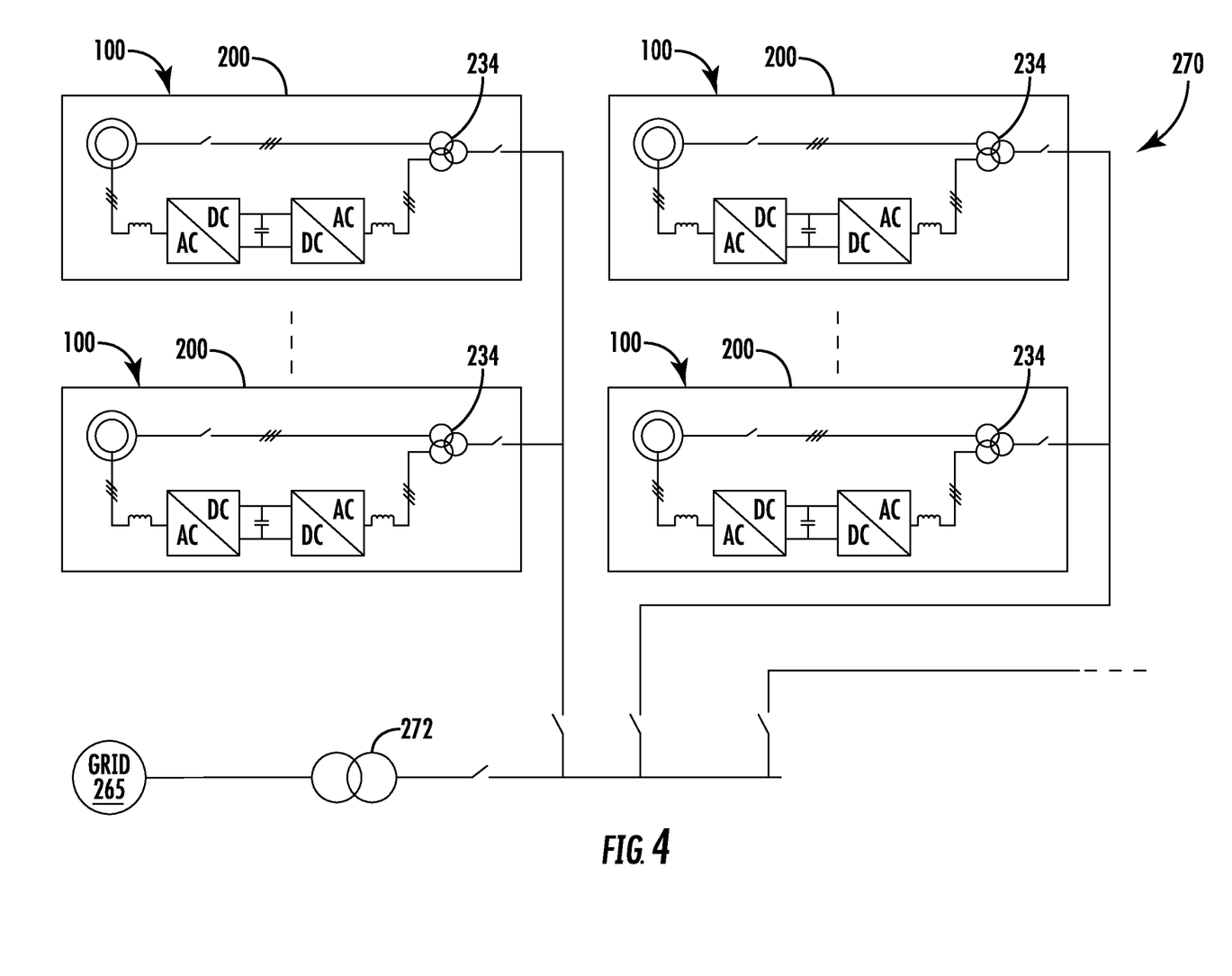
FIG. 4 illustrates a schematic diagram of one embodiment of a wind farm connected to a power grid via a sub-station transformer according to the present disclosure.
Figure 5:
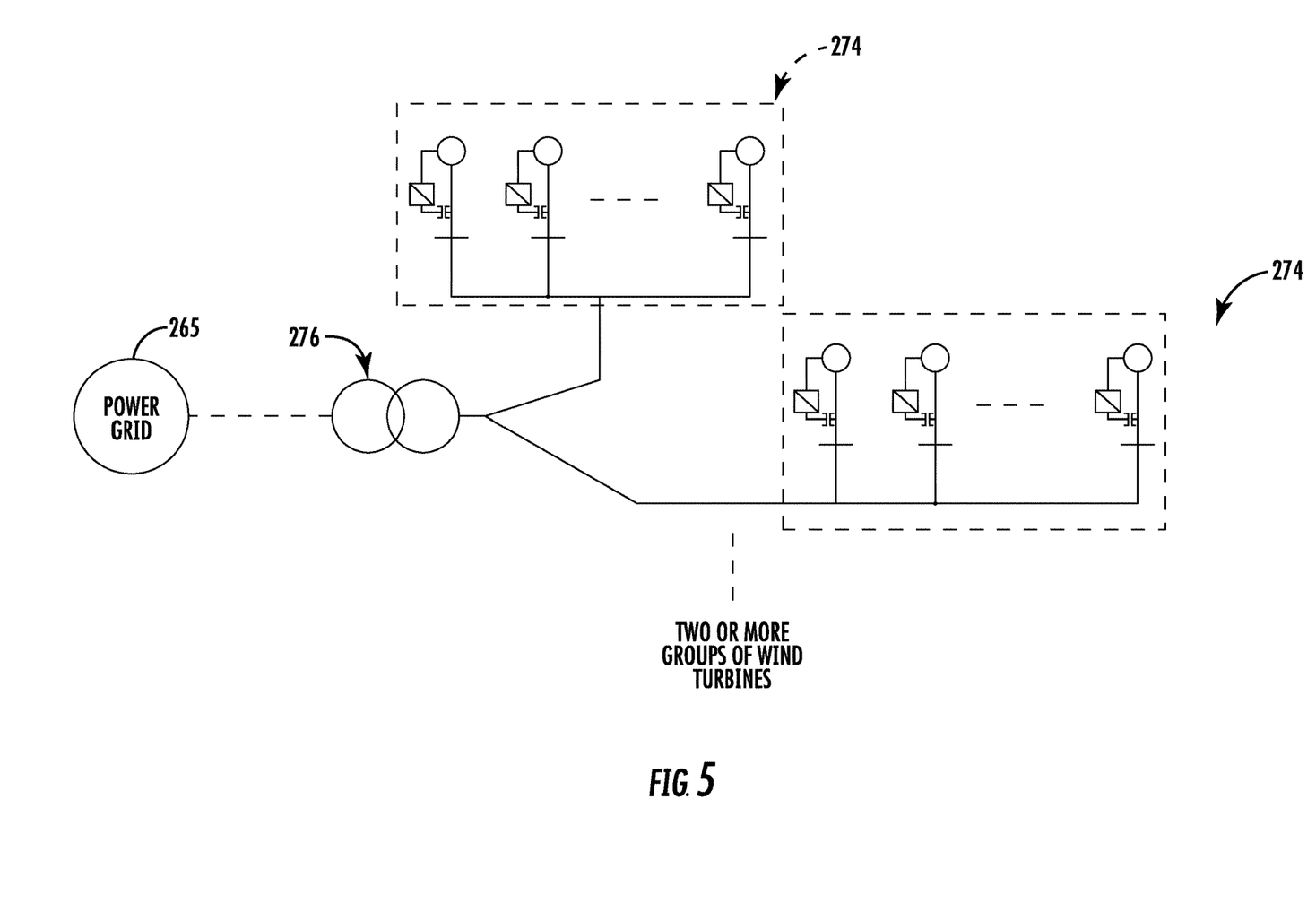
FIG. 5 illustrates a schematic diagram of one embodiment of wind turbine clusters connected to a power grid via a cluster transformer according to the present disclosure.

Referring now to FIG. 4, the wind turbine 100 may be part of a wind farm 270 having one or more wind turbines 100 geographically arranged together and connected to the power grid 265. More specifically, as shown, each of the wind turbines 100 may be connected to the power grid 265 via a main transformer 234. Further, as shown, the wind farm 270 may be connected to the power grid 265 via a sub-station transformer 272. In addition, as shown in FIG. 5, the wind turbines 100 (or wind farms 270) may be arranged into one or more clusters 274 or groups that are connected to the power grid 265 via a common cluster transformer 276.

Figure 6:
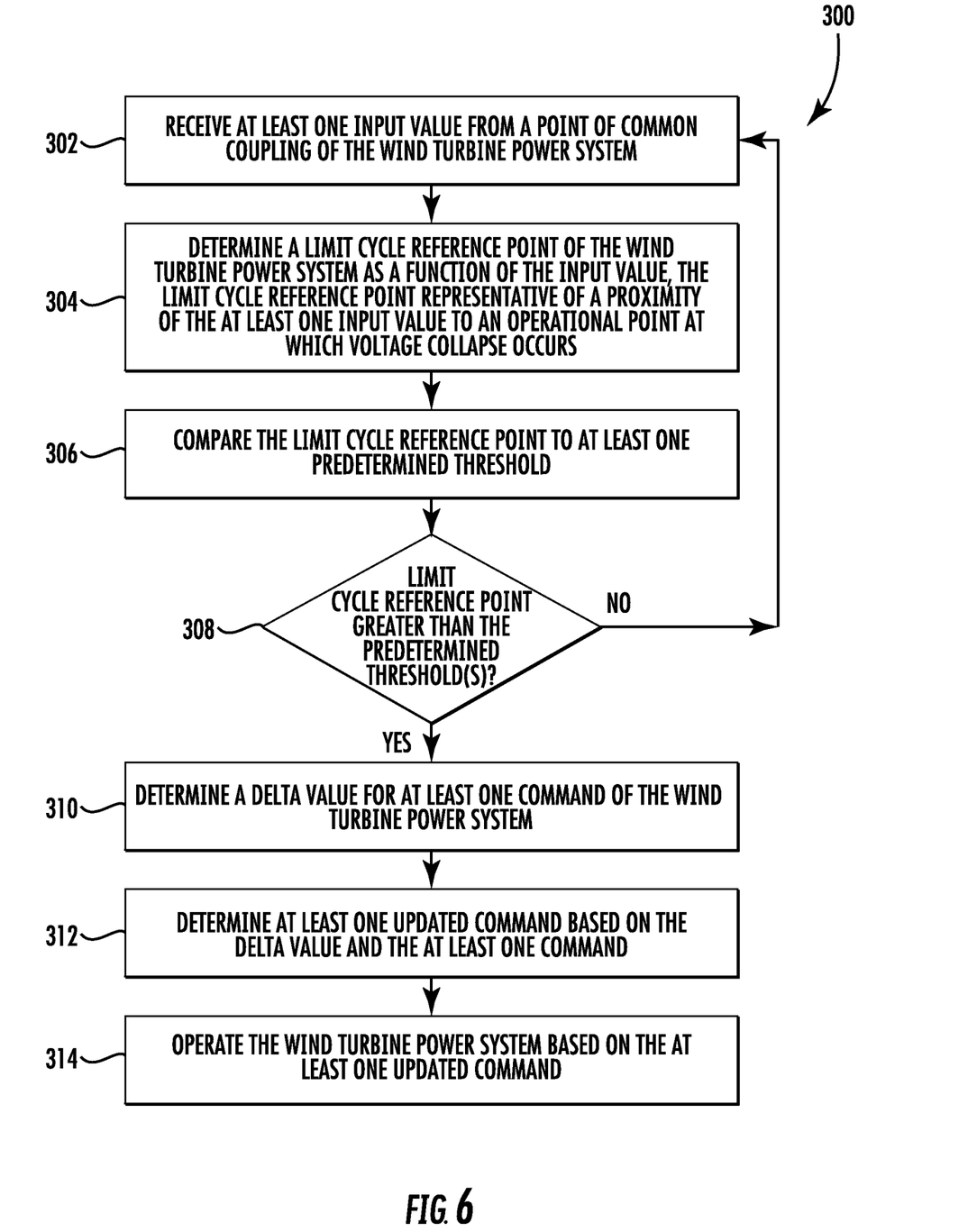
FIG. 6 illustrates a flow diagram of one embodiment of a method for preventing voltage collapse of a wind turbine power system connected to a power grid according to the present disclosure.
Figure 8:
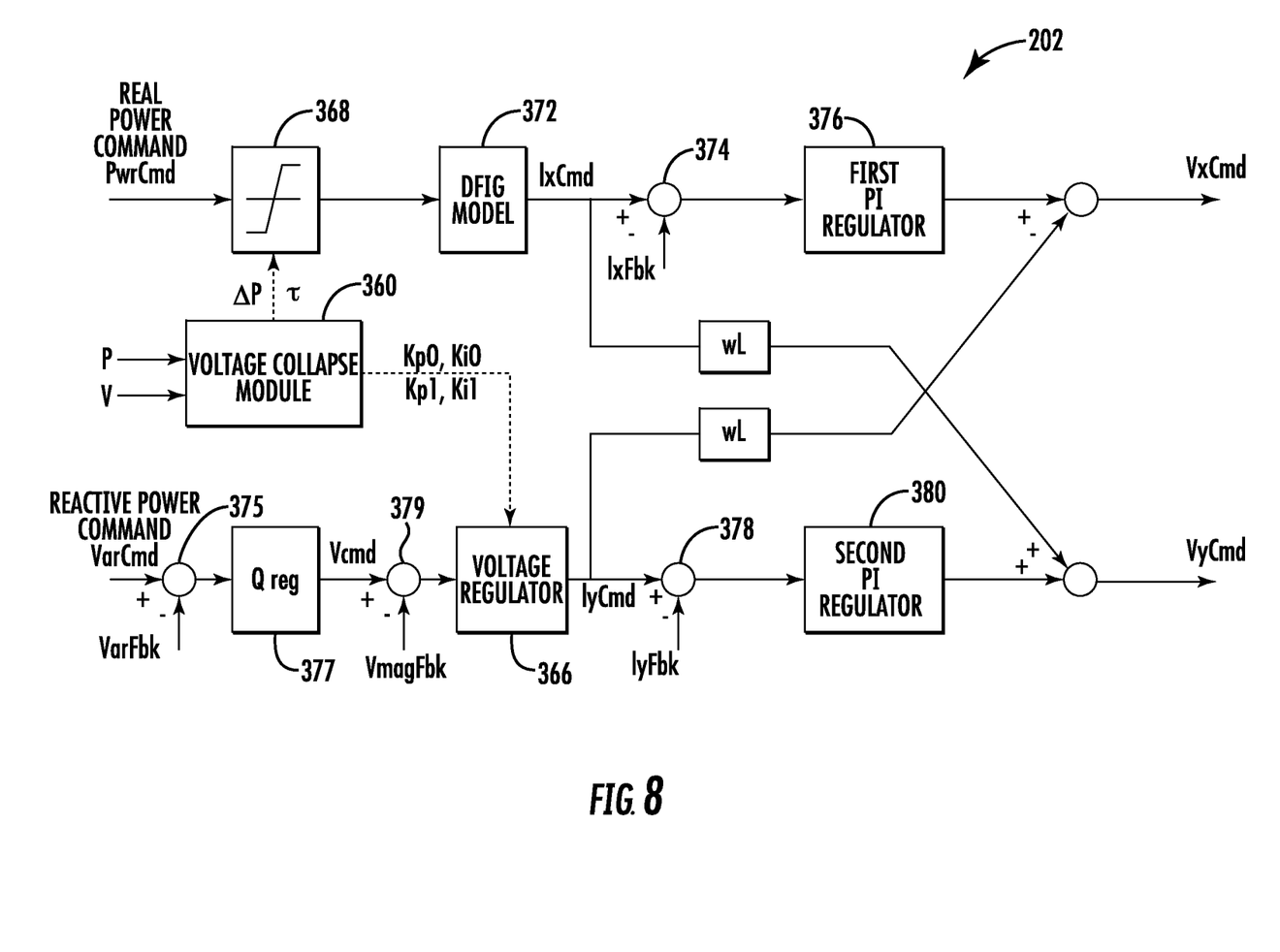
FIG. 8 illustrates a schematic diagram of one embodiment of a system for preventing voltage collapse of a wind turbine power system connected to a power grid according to the present disclosure.

Referring now to FIGS. 6 and 8, a method 300 and system for preventing voltage collapse of a wind turbine power system connected to the power grid 265 (such as any of the wind turbine arrangements of FIGS. 1, 4, and 5) are illustrated. More specifically, FIG. 6 illustrates a flow diagram of one embodiment of the method 300 for preventing voltage collapse of the wind turbine power system 100, whereas FIG. 8 illustrates a schematic diagram of various components of the corresponding system. Though the system and method 300 will be explained with specific reference to the wind turbine 100 of FIG. 1, it should be understood that any of the additional wind turbine arrangements described herein may also benefit from the system and method of the present disclosure. Further, in certain embodiments, the power grid 265 may be a weak grid, which is characterized by short circuit currents within a predetermined range of short circuit currents of the wind turbine power system. For example, in one embodiment, the predetermined range may include ratios of the short circuit currents of the power grid to the short circuit currents of the wind turbine power system of from about 0.8 to about 1.2.

Figure 7:
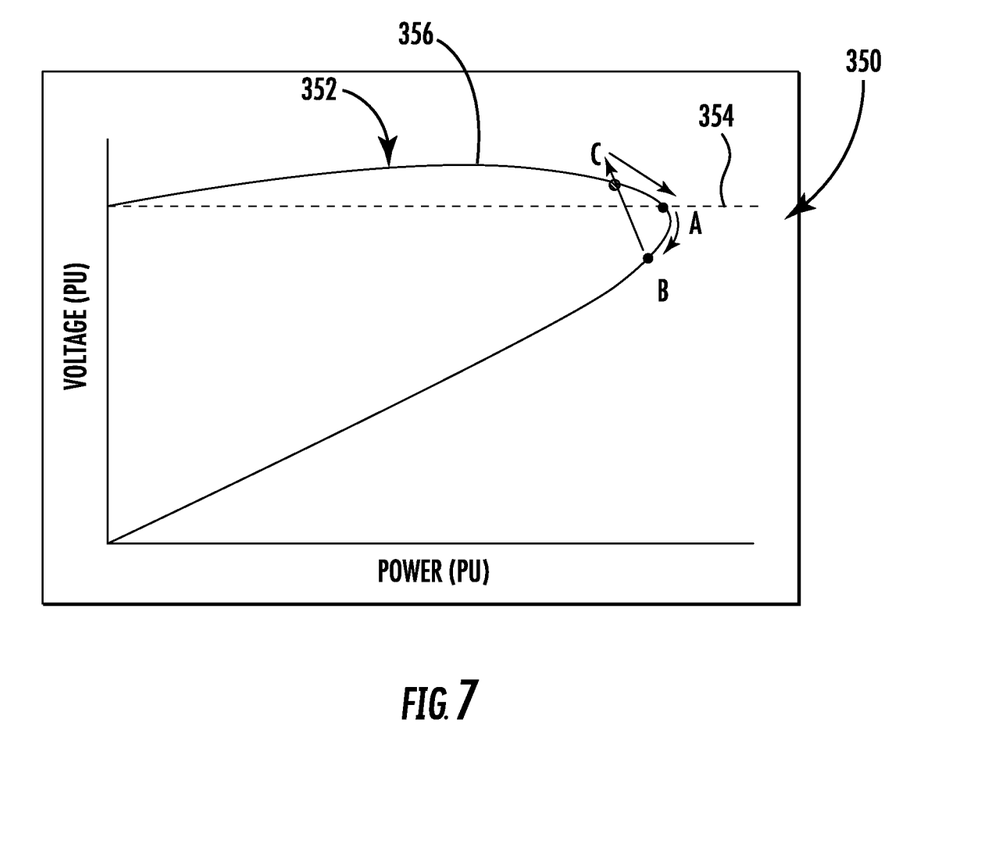
FIG. 7 illustrates a graph of voltage versus power at a certain power factor, particularly illustrating voltage collapse according to the present disclosure.

As used herein, voltage collapse generally refers to a system instability involving many power system components, as well as an entire power system. Further, voltage collapse is typically associated with a reactive power demand of load not being met due to shortage in reactive power production and transmission. As such, a voltage collapse typically occurs when the system serves load that has a higher reactive power demand than the system can supply. For example, as shown in FIG. 7, a graph of voltage versus power for a weak grid is provided to further illustrate voltage collapse. As shown, it is desirable for the wind turbine power system to operate at maximum power, i.e. near point A. As power is pushed into the grid 265, however, an impedance limit is reached (as shown at A-B-C). Thus, as shown, if the impedance limit is exceeded, the voltage collapses (i.e. the voltage drops to zero). In certain embodiments, the impedance limit is not a fixed value; rather, the limit varies according to the grid voltage, frequency, and/or turbine terminal voltage. Further, in one example, when the impedance limit is above a predetermined threshold above the wind turbine's 100 impedance base value or a short circuit ratio is below a certain value, the wind turbine 100 may be at risk of voltage collapse.

Accordingly, the method 300 of the present disclosure prevents voltage collapse of the wind turbine power system by accurately determining the impedance limit A-B-C and operating as close to point A as possible (e.g. ideally above and left of point A), without exceeding the limit. More specifically, the controller 202 may generally prevent the wind turbine 100 from operating past point A (i.e. the nose point). However, if operation of the wind turbine 100 point passes A, the controller 202 is also configured to detect a limit cycle phenomenon (i.e. oscillation of the power/voltage trajectory) by determining a limit cycle index (also referred to herein as LC_INDEX).

Thus, as long as the controller 202 operates above and left of point A (i.e. above threshold 354), the controller 202 follows a smooth curve 356. However, if the controller 202 operates between A and B, then operation of the wind turbine 100 exists in the triangle of A-B-C and the controller 202 no longer follows the smooth curve 356 above and left of point A. Rather, the operation of the wind turbine 100 moves to point C from point B without going back through point A (which is not part of the smooth curve 356). Such operation is referred to herein as the limit cycle phenomenon. Further, the return to point C is not likely to return to the smooth curve due to the disturbance in the controls that occurs when the controller 202 operates past point A.

As shown in FIG. 8, the system generally includes a voltage collapse module 360 for preventing voltage collapse of the wind turbine power system 100, which will be explained in more detail with reference to FIGS. 6 and 9. Further, as shown, the system generates real and reactive voltage commands $V_{xcmd}$ and $V_{ycmd}$ based on a real power command PwrCmd and a reactive power command VarCmd. The real power command PwrCmd is limited via a grid depending power limiter 368. The output from the grid depending power limiter 368 is input into a DFIG model 372, which generates a current command $I_{xcmd}$. The current command $I_{xcmd}$ is then compared to a current feedback signal km, at 374. A first PI regulator 376 then uses the current command $I_{xcmd}$ to generate the real voltage commands $V_{xcmd}$. In addition, as shown, the system compares the reactive power command VarCmd to a reactive power feedback VarFbk at 375. The difference is then utilized by the reactive power regulator 377 to generator a voltage command $V_{cmd}$. At 379, a voltage feedback $V_{magFbk}$ is subtracted from the voltage command $V_{cmd}$. The difference is received by a voltage regulator 366 that generators a current command $I_{ycmd}$. At 378, a current feedback $T_{yFbk}$ is subtracted from the current command $I_{yCmd}$. A second PI regulator 380 then uses the current command $I_{ycmd}$ to generate the real voltage commands $V_{ycmd}$.

Figure 9:
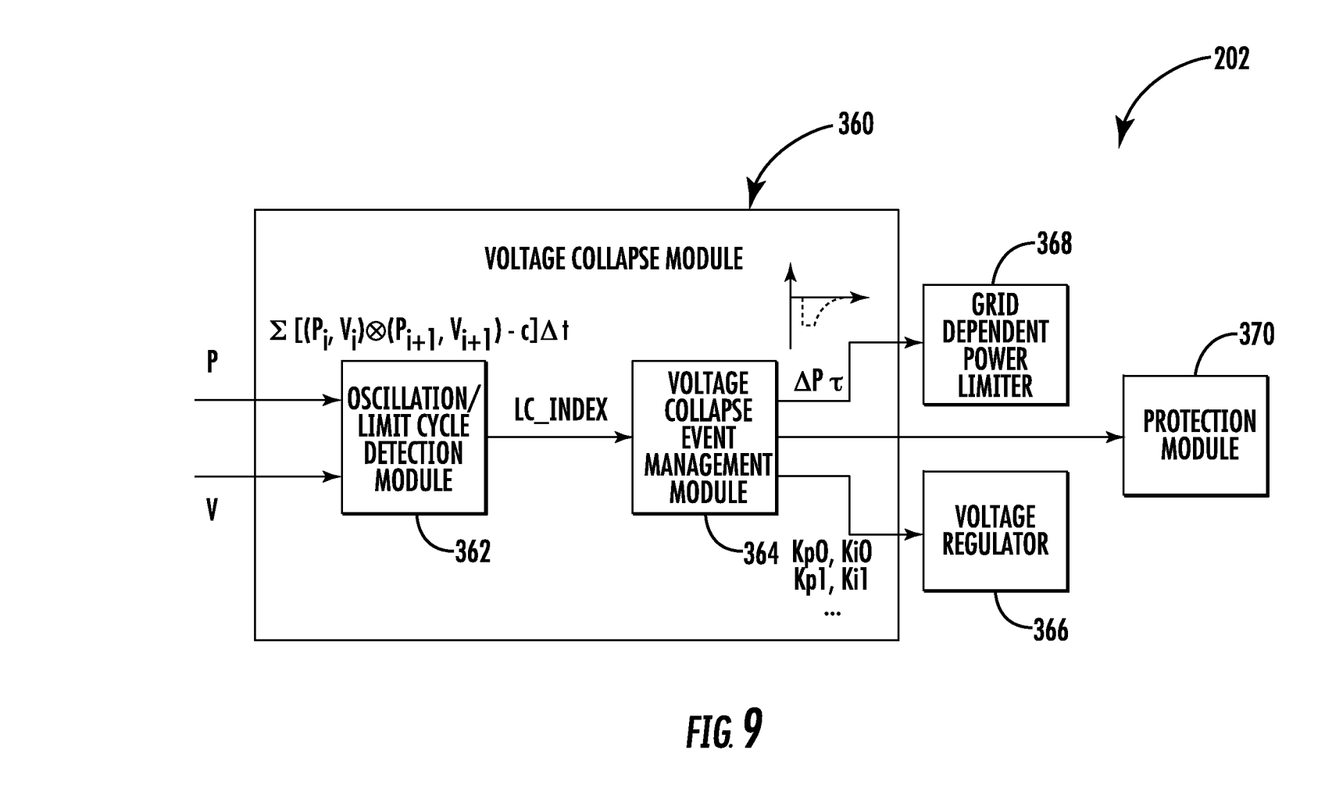
FIG. 9 illustrates a schematic diagram of one embodiment of a voltage collapse governor of a system for preventing voltage collapse of a wind turbine power system connected to a power grid according to the present disclosure.

Referring particularly to FIG. 6, the flow diagram illustrates various methods steps that may be implemented by the voltage collapse module 360 of the present disclosure. For example, as shown at 302, the method 300 includes receiving at least one input value from a point of common coupling of the wind turbine power system 100. For example, as shown in FIGS. 8 and 9, the input value(s) may include a power value P at the point of common coupling and/or a voltage value V at the point of common coupling. Further, as shown, the voltage collapse module 360 may include an oscillation/limit cycle detection module 362 that receives the power value P at the point of common coupling and/or the voltage value V at the point of common coupling. Referring back to FIG. 6, as shown at 304, the method 300 also includes determining a limit cycle reference point of the wind turbine power system 100 as a function of the input value(s). For example, as shown in FIG. 9, the oscillation/limit cycle detection module 362 may be configured to calculate the limit cycle reference point (e.g. LC_INDEX) as a function of the power value P and the voltage value V. More specifically, as shown in FIG. 9, the oscillation/limit cycle detection module 362 may use Equation (1) below to calculate the LC_INDEX:

$$LC\_INDEX = \Sigma[(P_i, V_i)*(P_{i+1}, V_{i+1}) - c]\Delta t$$

where i denotes at time i,
i+1 is the next moment in a discrete time period,
P is the output power,
V is the voltage, and
c is a slow bleeding coefficient.

As such, the LC_INDEX is determined by accumulating a cross product of a power/voltage vector in discrete time periods and provides a slow "bleeding" function. As used herein, the limit cycle reference point is representative of a proximity of the input value(s) to an operational point at which voltage collapse occurs. More specifically, as shown in FIG. 7, the operational point may correspond to a value on the curve 352 at which a slope of the curve is substantially vertical.

Referring back to FIG. 6, as shown at 306, the method 300 further includes comparing the limit cycle reference point to at least one predetermined threshold. For example, as shown in FIG. 9, the voltage collapse module 360 may include a voltage collapse event management module 364 that receives the limit cycle reference point (i.e. LC_index) and compares the index to the predetermined threshold(s). In one embodiment, the predetermined threshold(s) may include a first predetermined threshold and/or a second predetermined threshold. As shown at 308, if the limit cycle reference point is greater than the at least one predetermined threshold, the method 300 proceeds to 310. If the limit cycle reference point is less than the predetermined threshold(s), the method 300 returns to 302.

As shown at 310, the method 300 includes determining a delta value for at least one command of the wind turbine power system 100. As shown at 312, the method 300 includes determining at least one updated command based on the delta value and the command(s). For example, as shown in FIGS. 8 and 9, the voltage collapse module 360 may include a voltage collapse event management module 364 configured to add the delta power value AP to the power command or the power limiter of the wind turbine power system 100 if the limit cycle reference point is greater than the first predetermined threshold. In addition, as shown, the voltage collapse event management module 364 may also be configured to update one or more gain coefficients (e.g. Kp0, Ki0 to Kp1, Ki1) of the voltage regulator 366 of the wind turbine power system 100 if the limit cycle reference point is less than the first predetermined threshold and greater than the second predetermined threshold. In additional embodiments, the method 300 may include implementing a corrective action if the limit cycle reference point is greater than a damage threshold. For example, as shown in FIG. 9, the voltage collapse event management module 364 may sent a signal to a protection module 370 if the damage threshold is exceeded.

Referring back to FIG. 6, as shown at 314, the method 300 includes operating the wind turbine power system 100 based on the at least one updated command. For example, in one embodiment, the controller 202 may be configured to minimize an area of the curve 352 representative of a limit cycle so as to maximize power while preventing voltage collapse.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for preventing voltage collapse of a wind turbine power system connected to a power grid, the method comprising:
   receiving, via a controller of the wind turbine power system, at least one power value and at least one voltage value from a point of common coupling of the wind turbine power system;
   determining, via the controller, a limit cycle reference point of the wind turbine power system as a function of a cross product of the at least one power value and the at least one voltage value, the limit cycle reference point representative of a proximity of the at least one power value or the at least one voltage value to an operational point at which voltage collapse occurs, wherein the voltage collapse occurs when the wind turbine power system serves a load that has a higher reactive power demand than the wind turbine power system can supply;
   comparing the limit cycle reference point to at least one threshold;
   if the limit cycle reference point is greater than the at least one threshold, determining a delta value for at least one command of the wind turbine power system;
   determining at least one updated command based on the delta value and the at least one command; and,
   operating the wind turbine power system based on the at least one updated command.

2. The method of claim 1, wherein the at least one threshold comprises a first threshold, the method further comprising:
   adding the delta power value to at least one of a power command or a power limiter of the wind turbine power system if the limit cycle reference point is greater than the first threshold.

3. The method of claim 2, wherein the at least one threshold comprises a second threshold.

4. The method of claim 3, further comprising adding the delta power value to a one or more gain coefficients of a voltage regulator of the wind turbine power system if the limit cycle reference point is less than the first threshold and greater than the second threshold.

5. The method of claim 4, further comprising implementing a corrective action if the limit cycle reference point is greater than a damage threshold.

6. The method of claim 1, wherein the operational point corresponds to a value on a curve of the voltage value versus the power value at which a slope of the curve is substantially vertical.

7. The method of claim 6, wherein operating the wind turbine power system based on the at least one updated command further comprises minimizing an area of the curve representative of a limit cycle so as to maximize power while preventing voltage collapse.

8. The method of claim 1, wherein the power grid comprises a weak grid, the weak grid characterized by short circuit currents within a predetermined range of short circuit currents of the wind turbine power system.

9. The method of claim 8, wherein the predetermined range comprises ratios of the short circuit currents of the power grid to the short circuit currents of the wind turbine power system of from about 0.8 to about 1.2.

10. A system for preventing voltage collapse of a wind turbine power system connected to a power grid, the system comprising:
    one or more sensors for monitoring at least one power value and at least one voltage value from a point of common coupling of the wind turbine power system;
    a controller communicatively coupled to the one or more sensors, the controller configured to perform one or more operations, the one or more operations comprising:
    determining a limit cycle reference point of the wind turbine power system as a function of a cross product of the at least one power value and at least one voltage value, the limit cycle reference point representative of a proximity of the at least one power value and the at least one voltage value to an operational point at which voltage collapse occurs, wherein the voltage collapse occurs when the wind turbine power system serves a load that has a higher reactive power demand than the wind turbine power system can supply;
    comparing the limit cycle reference point to at least one threshold;
    if the limit cycle reference point is greater than the at least one threshold, determining a delta value for at least one command of the wind turbine power system;
    determining at least one updated command based on the delta value and the at least one command; and,
    operating the wind turbine power system based on the at least one updated command.

11. The system of claim 10, wherein the at least one threshold comprises a first threshold and a second threshold.

12. The system of claim 11, wherein the one or more operations further comprise:
    adding the delta power value to at least one of a power command or a power limiter of the wind turbine power system if the limit cycle reference point is greater than the first threshold, and,
    adding the delta power value to a one or more gain coefficients of a voltage regulator of the wind turbine power system if the limit cycle reference point is less than the first threshold and greater than the second threshold.

13. The system of claim 12, further comprising implementing a corrective action if the limit cycle reference point is greater than a damage threshold.

14. The system of claim 10, wherein the operational point corresponds to a value on a curve of the voltage value versus the power value at which a slope of the curve is substantially vertical, and wherein operating the wind turbine power system based on the at least one updated command further comprises minimizing an area of the curve representative of a limit cycle so as to maximize power while preventing voltage collapse.

15. The system of claim 10, wherein the power grid comprises a weak grid, the weak grid characterized by short circuit currents within a predetermined range of short circuit currents of the wind turbine power system, wherein the predetermined range comprises ratios of the short circuit currents of the power grid to the short circuit currents of the wind turbine power system of from about 0.8 to about 1.2.

16. The system of claim 10, wherein the wind turbine power system comprises a wind farm comprising one or more wind turbines connected to the power grid via at least one of a turbine transformer, a farm transformer, or a cluster transformer.

\* \* \* \* \*